Aug. 25, 1964 N. P. KNOTH 3,146,316

TAPE RECORDER

Filed July 10, 1958 2 Sheets-Sheet 1

INVENTOR.
Norman P. Knoth
BY Schroeder, Hofgren,
Brady & Wegner
Attys.

Aug. 25, 1964 N. P. KNOTH 3,146,316

TAPE RECORDER

Filed July 10, 1958 2 Sheets-Sheet 2

INVENTOR.
Norman P. Knoth
BY Schroeder, Hofgren, Brady & Wegner
Attys.

United States Patent Office 3,146,316
Patented Aug. 25, 1964

3,146,316
TAPE RECORDER

Norman P. Knoth, Chicago, Ill., assignor to Warwick Electronics Inc., a corporation of Delaware Filed July 10, 1958, Ser. No. 747,713
13 Claims. (Cl. 179—100.2)

This invention relates to a tape recorder and, more particularly, to a tape cartridge loading tape recorder.

An object of this invention is to provide a new and improved tape cartridge loading tape recorder avoiding the delays and problems encountered in manually loading a cartridge into a tape recorder.

Another object of this invention is to provide a cartridge loading mechanism for a tape recorder in which a cartridge may be easily placed in the loading mechanism and the loading mechanism then operated to move the cartridge to a predetermined position which places an exposed portion of the tape in operative position relative to tape recorder elements.

A further object of the invention is to provide mechanism for handling a cartridge holding a tape provided with a plurality of tape channels whereby the playing of successive channels involving a change of cartridge position relative to the recorder may be facilitated to permit utilization of successive tape channels with a minimum of cartridge change time between playing of channels.

Another object of the invention is to provide a tape recorder having a base with means for locating a tape recorder cartridge in an operating position, a loading holder having a slot for slidably receiving the cartridge, means mounting the holder for guided movement between a first position in which the cartridge is in operating position and a second position remote from the first position, means for yieldably urging the holder to one of said positions, means for shifting the holder to the other of said positions against the action of said yieldable means, means for retaining the holder in said other position, and means responsive to movement of the holder to said other position for initiating tape recorder operations.

Further objects and advantages will become apparent from the following detailed description taken in connection with the accompanying drawings in which.

Figure 1:
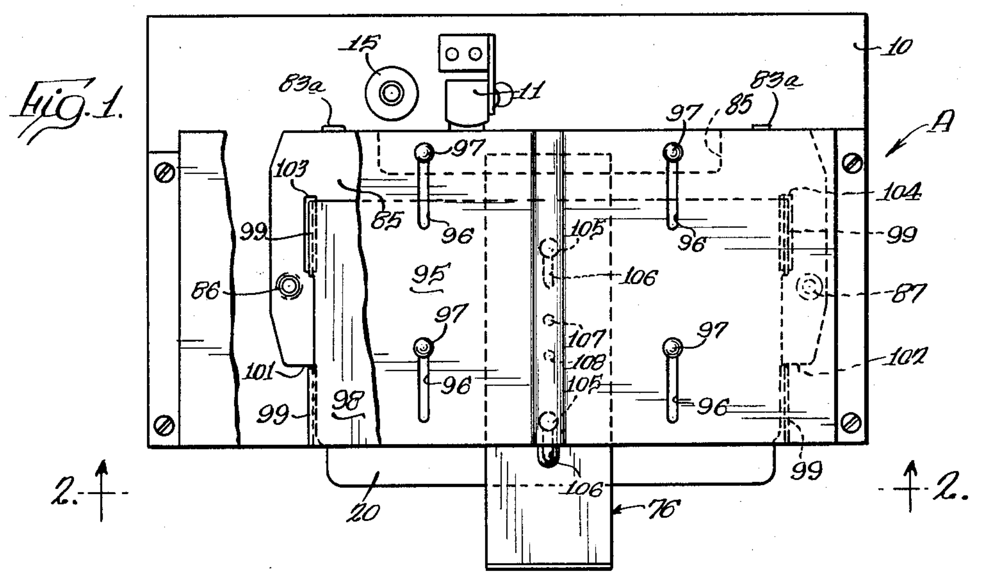
FIG. 1 is a plan view of the cartridge loading tape recorder with parts thereof broken away at the left-hand side thereof and with the cartridge only partly seated in the holder.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 7:
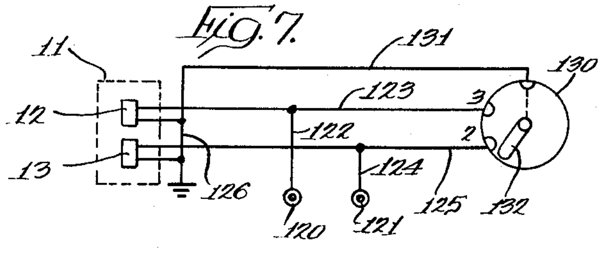
FIG. 7 is a schematic wiring diagram for the 2-channel head.

As shown in the drawings, the tape recorder indicated generally at A has a base 10 supporting transducing tape mechanism including a 2-channel magnetic head 11 having two distinct head elements 12 and 13 positioned one above the other, as shown in FIG. 7, each constituting a head channel for co-acting individually with different channels of a tape in monaural operations or simultaneously with two tape channels in stereo operation. Also mounted on the same side of a tape path as the head 11 is a movably mounted pressure roller 15 which is selectively engageable with a tape drive capstan 16 arranged at the opposite side of the tape path. Positioned adjacent the tape drive capstan and at the same side of the tape path is a movable backing element 17 for selectively engaging the tape against the magnetic head 11.

A tape cartridge, indicated generally at 20, may be readily moved by mechanism hereinafter described between a first position in which it is located in an operating plane with an exposed length of tape positioned between the drive capstan 16 and pressure roller 15 as well as the magnetic head 11 and the backing element 17 and a second position in a spaced parallel plane with the tape withdrawn from the between the aforesaid tape recorder elements. As a specific example, the cartridge 20 holds a tape which has four channels and the channels may each carry a separate recording. The four tape channels are individually associated with one or the other channel of the 2-channel head, and it is possible to successively play the four distinct channels on the tape. Alternatively, two tape channels can be utilized at a time in stereo operation with both head channels, so that two successive traverses of the tape past the head 11 will result in all four channels passing the head 11. With the cartridge in one position, two of the tape channels will be in operative relation with the channels 12 and 13 of the head while flip-over of the cartridge will place the other two tape channels in operative relation with the head channels. Means are provided for selectively determining whether both head channels will be operative or which of the head channels individually.

In order to more fully illustrate the invention, the cartridge 20 will herein be described although the invention is readily usable with other cartridges than the one disclosed. The cartridge body is a container having a top panel 21 and a bottom panel 22 with enclosing sides except for one side having a series of recesses 23. Two of the recesses 23 are adapted for receiving the tape drive capstan 16 and the head backing element 17 with exposed lengths of tape spanning the recesses 23 and defining a tape path. The tape within the cartridge is mounted on a pair of reel-like members 24 and 25, and the tape is guided by a pair of cartridge pins 26 and 27 fixed between the cartridge top and bottom panels. In order to control the tape in the cartridge when not in use, a brake member 28 is movably mounted within the cartridge on pins 29 and 30, and is normally urged into engagement with the reel-like members 24 and 25 by a spring 31. When the cartridge is placed in operative position on the recorder base 10, a brake release pin 32 supported on the base 10 of the recorder, cammingly engages an exposed end of the brake plate to shift and release the brake plate to free the tape for movement.

The base 10 of the tape recorder supports a motor, indicated generally at 40, which through a belt 42 drives a flywheel 41 operatively connected to the tape driven capstan 16.

Figure 4:
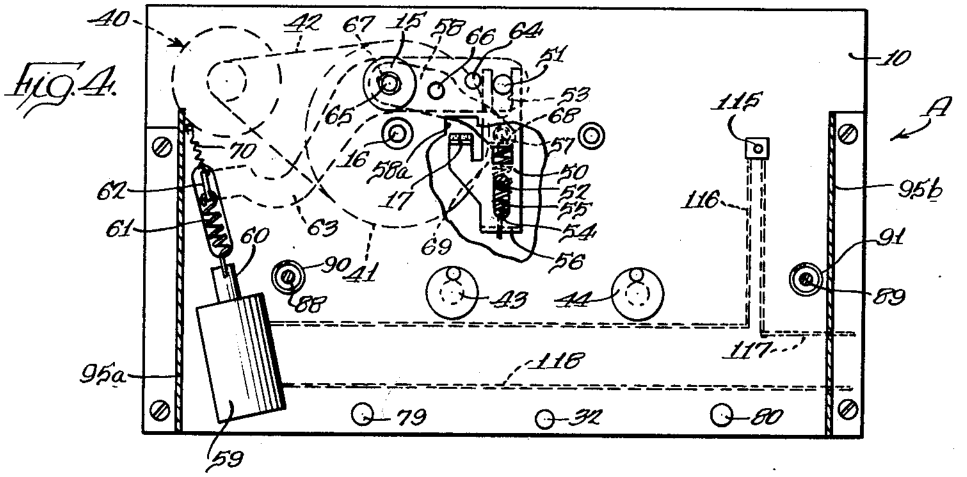
FIG. 4 is a plan section taken generally along the line 4—4 of FIG. 2.

A reel drive spindle 43 is also supported rotatably on the base plate 10 and is driven from the motor 40 in a counter-clockwise direction as viewed in FIG. 4, through a suitable clutch mechanism (not shown) operative to rotate the spindle when the cartridge seats in operative position. The reel-like members 24 and 25 of the cartridge 20 are similarly shaped on both sides and exposed through the top and bottom panels of the cartridge for alternate engagement with the spindle 43 depending upon the position of the cartridge. The reel spindle 44 is engageable with one of the reel-like members of the cartridge for obtaining rewind of the tape in the cartridge by selectively operable rewind mechanism (not shown).

Means for movably mounting the head backing element 17 includes a plate 50 mounted on the underside of the base 10 by pins 51 and 52 engageable in a pair of slots 53 and 54, respectively, formed in plate 50. A spring 55 is connected between an end 56 of the plate 50 and a pin 57 carried on an auxiliary arm 58. The spring is under tension for a purpose more fully described hereinafter. The backing element 17 is carried on an upturned flange on the plate 50 extending through an opening **58*a* in the base to lie above the base 10**.

Means for moving the pressure roller 15 toward the drive capstan 16 and the backing element 17 toward the head 11 includes a solenoid 59 mounted on the base 10 of the machine having a plunger 60 connected by a spring 61 to an end 62 of an operating arm 63 beneath the base and pivoted to the base 10 by a pin 64. The arm 63 rotatably carries the pressure roller 15 on a pin 65 extending through a slot in the base whereby pivoting movement of the arm about the pin 64 shifts the pressure roller relative to the drive capstan. The auxiliary arm 58 is disposed above the operating arm 63 and pivotally mounted on the base 10 by a pin 66. The auxiliary arm at one end is provided with a slot 67 which engages the pressure roller mounting shaft 65 whereby movement of the operating arm 63 results in pivoting movement of the auxiliary arm 58. An end 68 of the auxiliary arm 58 carries the pin 57 to which one end of the spring 55 is attached, and the pin 57 is engageable with a downturned flange 69 on the plate 50 to control the position of the plate 50.

In operation, energization of the solenoid 59 pulls on the plunger 60 to pivot the operating arm 63 in a counterclockwise direction, as viewed in FIG. 4, to move the pressure roller 15 towards the drive capstan 16, and this movement results in also pivoting the auxiliary arm 58 counterclockwise to move the pin 57 upwardly, as viewed in FIG. 4, whereby the spring 55 causes the plate 50 to follow and have the backing element 17 engage the magnetic head 11. The range of movement of the operating arm 63 is sufficient to carry the pin 57 out of engagement with the plate flange 69 so that the spring 55 may directly exert force on the plate 50 to yieldably urge the element 17 against the magnetic head 11. The spring 61 permits the armature 60 to fully seat in the solenoid 59 and maintain a compressive force of the pressure roller 15 on the capstan 16. Upon de-energization of the solenoid, a spring 70 connected to the end 62 of the operating arm 63 restores the parts to their initial position with the pin 57 on the auxiliary arm 58 moving the backing element 15 away from head 11.

Means are provided for receiving a tape cartridge and placing the cartridge into an operative position in association with the tape recorder elements comprising a loading holder indicated generally at 75 which is mounted for movement toward and away from the base, and operating mechanism including an operating member, indicated geenrally at 76, manually operable to raise and lower the loading holder 75.

The cartridge 20 is provided with suitable aligning apertures which engage on cartridge locating means associated with the base comprising upstanding shouldered pins 77 and 78 positioned adjacent the magnetic head 11. A pair of pins 79 and 80 adjacent the front of the machine are engageable by the bottom panel 22 of the cartridge for further location thereof. The locating means determines the proper location of the cartridge 20 in an operating plane with the exposed tape at a proper level relative to the magnetic head 11.

Figure 2:
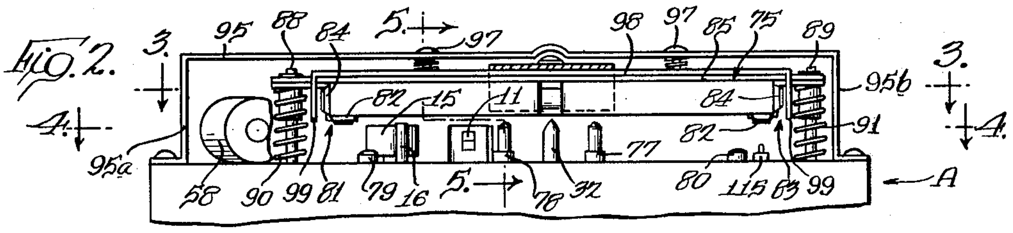
FIG. 2 is a fragmentary front elevational view of the cartridge loading tape recorder with parts thereof broken away and with the cartridge positioned as shown in FIG. 1.
Figure 3:
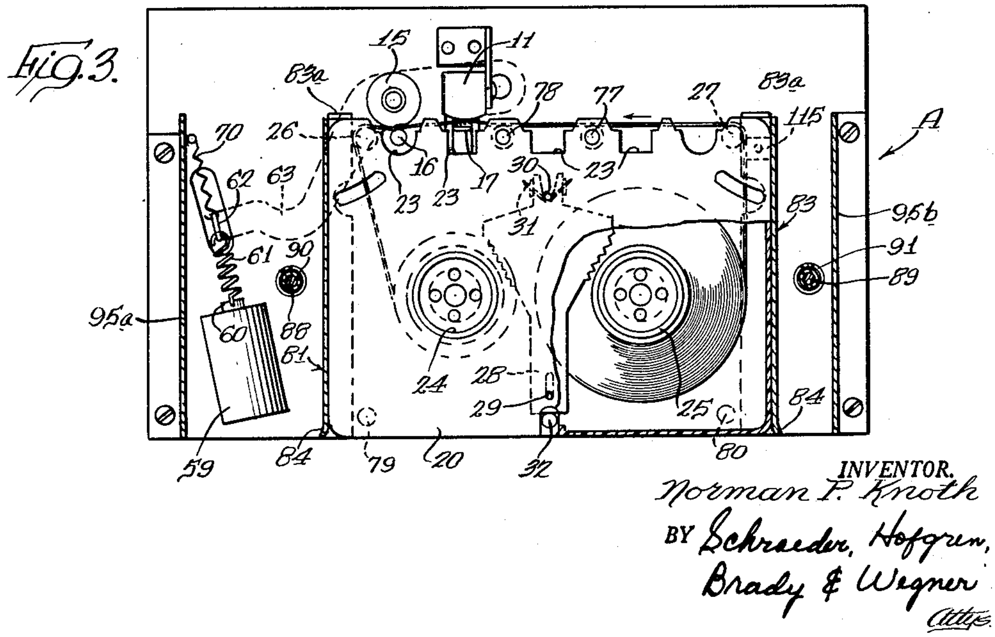
FIG. 3 is a plan section taken generally along the line 3—3 in FIG. 2 and with the cartridge and tape recorder elements shown in operating position.
Figure 5:
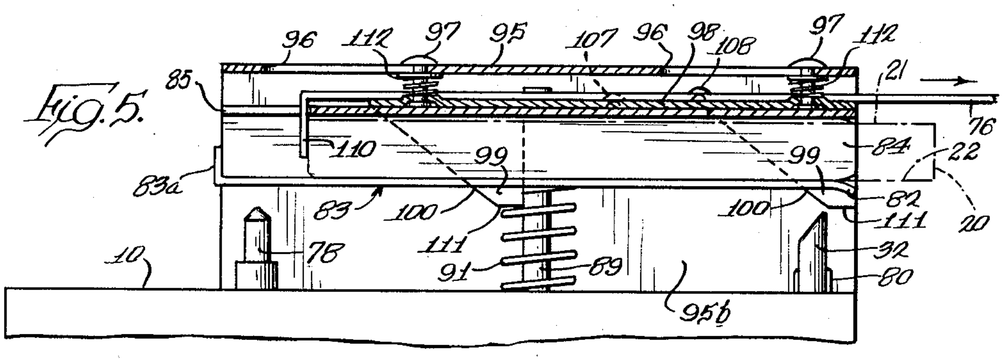
FIG. 5 is a vertical section taken generally along the line 5—5 in FIG. 2 with part of the operating member broken away.

The loading holder 75 comprises means for slidably receiving a cartridge, including a pair of spaced apart side rails, indicated generally at 81 and 83, each of which have an elongated bottom runner 82 and side runners 84. The side rails 81 and 83 are interconnected by a top plate 85 spanning the loading holder and provided with a pair of apertures 86 and 87 for slidably mounting the holder relative to the base 10 on guide members in the form of guide rods 88 and 89 extending upwardly from the base. As shown in FIGS. 2 and 5, the side rail runners 82 and 84 are outwardly turned at their ends to facilitate entry of a cartridge into the holder and with the top plate 85 of the holder define a slot into which the cartridge may be loaded manually with the underside of the cartridge for the most part exposed to permit association of the cartridge with the various elements carried on the base of the recorder. One end of the runners 82 is provided with cartridge locating stops **83*a*** which locate a cartridge in vertical alignment with its final operative position.

Figure 6:
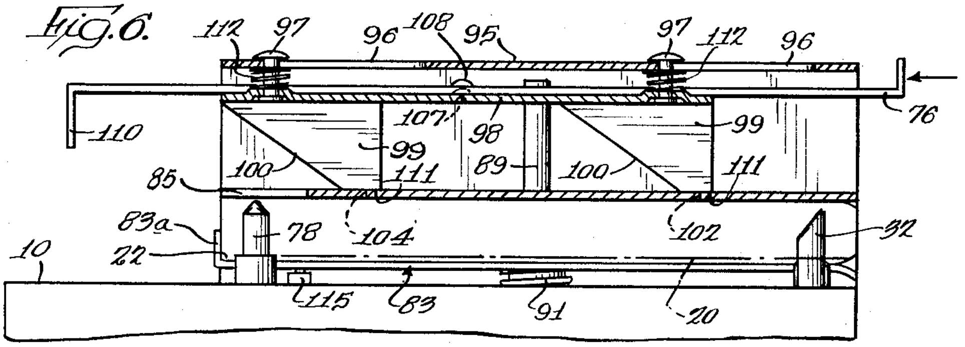
FIG. 6 is a view similiar to FIG. 5 showing the loading mechanism positioned with the cartridge in its operating position.

As shown in FIGS. 2 and 5, the loading holder 75 is in its second position in a plane spaced from the first position of the holder (as shown in FIG. 6) in which the holder is in an operating plane relative to the tape recorder elements. A coil spring 90 surrounds the guide rod 88 and a coil spring 91 surrounds the guide rod 89 to yieldably urge the holder 75 upwardly to its second position.

A frame 95 overlies the holder 75 and includes legs **95*a* and 95*b* secured to the base 10 of the recorder, and the frame carries the operating mechanism for moving the loading holder 75** toward the base.

The frame 95 is provided with a series of elongated slots 96, each of which slidably receives a headed pin 97 which slidably mounts an operating plate 98 having a pair of downturned members 99 at each side thereof with each of the members 99 having an inclined cam surface 100. The members 99 adjacent the front of the recorder and at opposite sides of the loading holder 75 are positioned to have their cam surfaces 100 engage edges 101 and 102 of the loading holder plate 85 while the rearwardly disposed pair of members 99 are arranged to have their cam surfaces 100 coact with an edge 103 and an edge 104 of a pair of slots formed in the holder plate 85.

Referring more particularly to FIG. 5 which shows the cartridge in its raised position, the members 99 are shown in their initial position. The members 99 are shown in FIG. 6 with the cartridge in its operating plane in which the cam surfaces 100 have depressed the loading holder 75 along guide rods 88 and 89 in response to movement of the operating plate 98 toward the left, as viewed in FIG. 6.

The manually engageable operating member 76 moves the operating plate 98. The operating member 76 is slidably mounted on the operating plate for limited relative movement by a pair of pins 105 attached to the operating plate 98 and slidably mounted in slots 106 formed in the operating member 76. The slots 106 limit the extent of the movement of operating member 76 relative to the operating plate 98. A detent arrangement including dimples 107 and 108 in the operating plate 98 and operating member 76, respectively, maintains the parts yieldably in the relation shown in FIG. 6.

In operation, the loading mechanism is positioned as shown in FIG. 5 and the manual insertion of a cartridge through the slot of the loading holder 75 into engagement with stops 83*a* will cause the leading edge of the cartridge to engage a downturned end 110 of the operating member 76 and carry the operating member toward the left, as viewed in FIG. 5, to interengage the dimples 107 and 108. This will place the cartridge in vertical alignment with the desired tape path, and manual movement of the operating member 76 rearwardly will cause the cam surfaces 100 to lower the holder 75 and the cartridge to its operating position seated on the locating elements 77, 78, 79 and 80. When a cartridge is to be withdrawn, the operating member 76 is moved forwardly or to the right as shown in FIG. 6, and the springs 90 and 91 then function to raise the holder 75 to its upper position with the cartridge still positioned to have the tape in vertical alignment with the tape path. The dimples 107 and 108 up to this point have prevented relative movement between the operating member 76 and the operating plate 98. A further pull on the operating member 76 causes relative movement between the member and plate 98, and the downturned end 110 of the operating member will then partially withdraw the cartridge from the holder so that it may be easily grasped by a user. The cartridge may then be replaced by another cartridge, or the cartridge inverted and the loading process repeated to associate another channel of the tape with a magnetic head channel.

The loading holder 75 is retained in its down position by flat lower ends 111 of the members 99 which rest upon the top of the holder plate 85 when the holder is in its down position. In order to provide for lost motion in the operating mechanism, the operating plate 98 is floatingly mounted by the headed pins 97 and springs 112 surrounding pins 97 permit yielding of the operating mechanism for the holder to yieldably maintain the cartridge in location on the cartridge locating means.

Means responsive to movement of the cartridge to operative position to initiate operation of tape recorder components includes a switch 115 located on the base 10 in a position to underlie the bottom member 82 of the side rail 83 of the loading holder. Movement of the loading holder to the position of FIG. 6 closes the switch 115 to energize the solenoid 59. The switch and solenoid are connected by a circuit including line 116 and lines 117 and 118 connected to opposite sides of a power supply.

Means to select the appropriate tape channel in monaural operation or to select stereo operation is shown in FIG. 7, in which a pair of jacks 120 and 121 are individually connected to one side of different amplifier circuits. The jack 120 is connected to the head channel 12 winding by lines 122 and 123 and the jack 121 is connected to the head channel 13 winding by lines 124 and 125. The other side of each channel winding is connected to ground by a line 126. A three-position switch 130 is provided with a connection to ground by line 131 and a grounded switch member 132. The switch member has a first position, as shown in FIG. 7, for stereo operation in which both of the head channel windings are in operative relation with the jacks 120 and 121. In position 2, of the movable switch member 132, the channel 13 is shorted by connecting line 125 to the ground connection 131 which leaves the jack 120 operatively associated with the channel 12 winding for monaural operation. In position 3 of the switch member 132, the circuit to the channel 12 winding is grounded, which leaves the jack 121 operatively associated with the channel 13 winding for monaural operation.

With four channels in the tape, the foregoing selecting means permits both channels of the head to be operative with two channels of the tape for stereo operation, and after passage of the tape in one direction the cartridge may be flipped over to utilize the other two lanes in stereo operation. The four tape channels may be used successively in monaural operation by the positioning of the switch 130 between positions 2 and 3 and the proper inverting of the cartridge. For illustration, if the tape channels are identified as D, E, F, G from top to bottom of the tape the head channels would be associated with tape channels D and F in one cartridge position and tape channels E and G in the inverted position of the cartridge.

Although the foregoing description has been in connection with a play-back operation, it is believed well within the skill of one skilled in the art to utilize the same mechanism for a recording operation in which an erase head would also be mounted on the base 10 of the recorder.

I claim:

1. A tape recorder adapted to receive a tape cartridge having locating apertures and an exposed length of tape comprising, in combination, a base having a reel driving spindle and cartridge locating pins thereon, a 2-channel magnetic head and coacting backing element at opposite sides of a tape path mounted for relative movement toward and away from each other, a drive capstan and pressure roller mounted at opposite sides of the tape path for relative movement toward and away from each other, a cartridge loading holder having spaced apart side rails with one of their ends exposed and interconnected by a top plate to form a cartridge loading slot whereby a cartridge may slide into the holder on the side rails and have the cartridge underside exposed with a length of exposed tape overlying the tape path, a pair of guide rods on said base on which the loading holder is slidably mounted for movement between a first position in which the cartridge is in an operating plane on said locating pins with exposed tape positioned adjacent the head and capstan and a second position spaced a greater distance from the base than the first position, springs on said guide rods engageable between the base and loading holder for urging the holder to said second position, a frame fixed to the base and overlying the loading holder, operating mechanism for the holder including an operating member slidable on said frame and members with inclined cam surfaces engageable with the holder to urge the holder from the second position to the first position to move a cartridge to the operating plane, the lower ends of said members being engageable with the top of the holder to hold the holder in said first position, a cartridge engaging flange on one end of said operating member whereby movement of the operating member in one direction lowers the holder toward the base to said first position and movement of the operating member in the reverse direction releases the holder and permits raising of the holder by said springs with the final movement of the operating member causing the flange to pull a cartridge partially from the holder, means to select either of the two individual channels or both channels simultaneously, and means responsive to movement of a cartridge into the operating plane for relatively moving the head and backing element and capstan and pressure roller toward each other to operatively engage a tape.

2. A tape cartridge utilizing tape recorder comprising, in combination, a base having a reel driving spindle and cartridge locating means thereon, a 2-channel magnetic head and coacting backing element at opposite sides of a tape path mounted for relative movement toward and away from each other, a drive capstan and pressure roller mounted at opposite sides of the tape path for relative movement toward and away from each other, a cartridge loading holder having spaced apart side rails with one of their ends exposed and interconnected by a top plate to form a cartridge loading slot whereby a cartridge may slide into the holder on the side rails and have the cartridge underside exposed with a length of exposed tape overlying the tape path, means mounting the holder on the base for movement between a first position in which the cartridge is in an operating plane and engaged with said locating means with exposed tape positioned adjacent the head and capstan and a second position spaced a greater distance from the base than the first position, operating mechanism including an operating member and members with inclined cam surfaces engageable with the holder to urge the holder from the second position to the first position to move a cartridge to the operating plane, the lower ends of said member being engageable with the top of the holder to hold the holder in said first position, means to select either of the two individual head channels, and means responsive to movement of a cartridge into the operating plane for moving the head and backing element and capstan and pressure roller toward each other to engage a tape.

3. A tape recorder comprising, in combination a base having cartridge locating means thereon, a magnetic head at one side of a tape path, a cartridge loading holder having spaced apart side rails with one of their ends exposed and interconnected by a top plate to form a cartridge loading slot whereby a cartridge may slide into the holder on the side rails and have the cartridge underside exposed with a length of exposed tape overlying the tape path, guide means on said base on which the loading holder is slidably mounted for movement between a first position in which the cartridge is in an operating plane and on said locating means with exposed tape positioned adjacent the head and a second position spaced a greater distance from the base than the first position, means for urging the holder to said second position, a frame fixed to the base and overlying the loading holder, and means comprising an operating member slidable on said frame and members with inclined cam surfaces engageable with the holder to urge the holder from the second position to the first position to move a cartridge to the operating plane.

4. A tape cartridge utilizing tape recorder comprising, in combination, a base having a reel driving spindle, a 2-channel magnetic head and coacting backing element at opposite sides of a tape path mounted for relative movement toward and away from each other, a drive capstan and pressure roller mounted at opposite sides of the tape path for relative movement toward and away from each other, means for locating a cartridge in an operating plane with a tape in operative position in said tape path, a cartridge loading holder movable between a first position in said operating plane and a second position in another plane, means on said holder for holding a cartridge placed therein, means for moving said holder between first and second positions, means to select either of the two individual channels and means responsive to movement of the holder into the operating plane for moving the head and backing element and capstan and pressure roller toward each other to engage a tape.

5. A cartridge loading tape recorder for a tape cartridge having a length of exposed tape, comprising, tape drive mechanism including a tape drive capstan and coacting pressure roller mounted for movement relative to each other and on opposite sides of a tape path, tape transducing mechanism comprising a magnetic head and backing element mounted for movement relative to each other and on opposite sides of the tape path, means for relatively moving the pressure roller toward the capstan and the backing element toward the head, means for locating a tape cartridge in operative position relative to said capstan and pressure roller with the exposed length of tape disposed along the tape path, means for moving a cartridge into located operative position, and means responsive to final movement of said cartridge moving means to place a cartridge in located position for initiating operation of said pressure roller and backing element moving means.

6. A cartridge loading tape recorder for a tape cartridge having a length of exposed tape, comprising, tape drive mechanism including a tape drive capstan and coacting pressure roller mounted for movement relative to each other and on opposite sides of a tape path, tape transducing mechanism comprising a magnetic head and backing element mounted for movement relative to each other and on opposite sides of the tape path, means for relatively moving the pressure roller toward the capstan and the backing element toward the head, means for locating a cartridge in operative position relative to said capstan and pressure roller with the exposed length of tape disposed along the tape path, and means for receiving a cartridge disposed above said operative position and moving the cartridge into located operative position.

7. In a tape recorder, in combination, a base having means for locating a tape recorder cartridge in an operating position, a loading holder having means for slidably receiving the cartridge, means mounting the holder for guided movement between a first position in which the cartridge is in operating position and a second position above the first position, means for yieldably urging the holder to one of said positions, means for shifting the holder to the other of said positions against the action of said yieldable means, means for retaining the holder in said other position, and means responsive to movement of the holder to said other position for initiating tape recorder operations.

8. In a tape recorder, in combination, a base having means for locating a tape recorder cartridge in an operating position, means for slidably receiving the cartridge, means mounting the cartridge receiving means for guided movement between a first position in which the cartridge is in operating position and a second position spaced from the first position, means for yieldably urging the cartridge receiving means to one of said positions, means for shifting the cartridge receiving means to the other of said positions against the action of said yieldable means, and means for retaining the cartridge receiving means in said other position.

9. A cartridge loading tape recorder comprising, a base, a magnetic head positioned on said base adjacent a tape path, means on said base for locating a tape cartridge relative to the head with an exposed tape length in said tape path, a cartridge loader mounted for movement toward and away from the base and having a cartridge receiving opening, and means for shifting the loader toward the base to engage a cartridge with the locating means and place the exposed tape length in the path.

10. A tape cartridge loading mechanism, comprising, a base, a capstan and a magnetic head disposed along a tape path, a pressure roller and backing element movably mounted for association with the capstan and head respectively, a plurality of cartridge locating members on the base, a frame positioned above the base, a cartridge loader floatingly mounted within the frame; yieldable means urging said loader away from the base, a member for operating said cartridge loader slidable on the frame, and means associated with the member for moving the loader toward the base in response to sliding movement of the member.

11. A cartridge loading tape recorder comprising, means for locating a cartridge in an operating plane with a tape in operative position, a cartridge loading holder movable between a first position in said operating plane and a second position in another plane, means on said holder for holding a cartridge placed therein, and means for moving said holder between first and second positions including a shiftable operating member and elements movable by said operating member and engageable with the holder.

12. A cartridge loading tape recorder comprising, means for locating a cartridge in an operating plane with a tape in operative position relative to tape recorder elements, a cartridge loading holder movable between a first position in said operating plane and a second position in a different spaced parallel plane, means on said holder for slidably receiving a cartridge advanced into the holder by movement in said spaced parallel plane, and means for moving said loader between first and second positions.

13. A cartridge loading tape recorder having a magnetic head comprising, means for locating a cartridge in an operating plane with a tape in operative position relative to the head, a cartridge loading holder movable between a first position in said operating plane and a second position in another plane, means on said holder for holding a cartridge placed therein, and means for moving said holder between the first and second positions.

References Cited in the file of this patent

UNITED STATES PATENTS

| | | |
|---|---|---|
| 2,712,448 | Schroter | July 5, 1955 |
| 2,804,508 | Masting et al. | Aug. 27, 1957 |
| 2,821,576 | Gaubert | Jan. 28, 1958 |
| 2,911,215 | Cousino | Nov. 3, 1959 |

FOREIGN PATENTS

| | | |
|---|---|---|
| 1,055,028 | France | Oct. 14, 1953 |
| 1,138,699 | France | Jan. 28, 1957 |
| 793,519 | Great Britain | Apr. 16, 1958 |